United States Patent
Tsukiyama et al.

(10) Patent No.: US 11,181,308 B2
(45) Date of Patent: Nov. 23, 2021

(54) AIR-CONDITIONER THAT PREVENTS DEGRADATION IN HEATING CAPABILITY DURING DEFROSTING OPERATION

(71) Applicant: Mitsubishi Electric Corporation, Tokyo (JP)

(72) Inventors: Ryo Tsukiyama, Tokyo (JP); Masahiro Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/957,899

(22) PCT Filed: Mar. 6, 2018

(86) PCT No.: PCT/JP2018/008539
§ 371 (c)(1),
(2) Date: Jun. 25, 2020

(87) PCT Pub. No.: WO2019/171463
PCT Pub. Date: Sep. 12, 2019

(65) Prior Publication Data
US 2021/0055025 A1 Feb. 25, 2021

(51) Int. Cl.
*F25B 47/02* (2006.01)
*F25B 49/02* (2006.01)
(Continued)

(52) U.S. Cl.
CPC ............ *F25B 49/022* (2013.01); *F24F 11/41* (2018.01); *F25B 39/00* (2013.01); *F25B 41/31* (2021.01);
(Continued)

(58) Field of Classification Search
CPC ........ F25B 47/02; F25B 47/022; F25B 49/02; F25B 49/022; F25B 2347/02; F24F 11/41
See application file for complete search history.

(56) References Cited

U.S. PATENT DOCUMENTS

2018/0051919 A1* 2/2018 Bangheri ................ F25B 30/04

FOREIGN PATENT DOCUMENTS

EP 3 306 216 A1 4/2018
JP H08-028932 A 2/1996
(Continued)

OTHER PUBLICATIONS

International Search Report of the International Searching Authority dated May 15, 2018 for the corresponding International application No. PCT/JP2018/008539 (and English translation).

*Primary Examiner* — Jonathan Bradford
(74) *Attorney, Agent, or Firm* — Posz Law Group, PLC

(57) ABSTRACT

An air-conditioner includes: a refrigerant circuit through which a refrigerant flows, the refrigerant circuit being formed of a compressor, a switching valve, a first heat exchanger, an expansion valve, and a second heat exchanger connected to one another by a first pipe; a heat-transfer medium circuit through which a heat-transfer medium flows, the heat-transfer medium circuit being formed of a pump, the first heat exchanger, and a third heat exchanger connected to one another by a second pipe; and control device that controls the compressor and the pump. In an operation of the air-conditioner performed before entering a defrosting operation, the control device increases a frequency of the compressor, as compared to the frequency of the compressor in a heating operation, and reduces a rotational speed of the pump, as compared to the rotational speed of the pump in the heating operation.

9 Claims, 10 Drawing Sheets

(51) Int. Cl.
  *F25B 41/31* (2021.01)
  *F25B 39/00* (2006.01)
  *F24F 11/41* (2018.01)

(52) U.S. Cl.
  CPC ............ *F25B 47/02* (2013.01); *F25B 47/022* (2013.01); *F25B 2347/02* (2013.01); *F25B 2600/024* (2013.01); *F25B 2600/13* (2013.01); *F25B 2700/13* (2013.01); *F25B 2700/2103* (2013.01)

(56) References Cited

FOREIGN PATENT DOCUMENTS

| JP | 2014-228261 A | 12/2014 |
| WO | 2016/194190 A1 | 12/2016 |

* cited by examiner

→ FLOW OF REFRIGERANT DURING HEATING OPERATION AND PREHEATING OPERATION
--→ FLOW OF REFRIGERANT DURING DEFROSTING OPERATION
⇒ FLOW OF HEAT-TRANSFER MEDIUM

→ FLOW OF REFRIGERANT DURING HEATING OPERATION AND PREHEATING OPERATION
--→ FLOW OF REFRIGERANT DURING DEFROSTING OPERATION
➡ FLOW OF HEAT-TRANSFER MEDIUM

→ FLOW OF REFRIGERANT DURING HEATING OPERATION AND PREHEATING OPERATION
--▶ FLOW OF REFRIGERANT DURING DEFROSTING OPERATION
⇒ FLOW OF HEAT-TRANSFER MEDIUM

AIR-CONDITIONER THAT PREVENTS DEGRADATION IN HEATING CAPABILITY DURING DEFROSTING OPERATION

CROSS REFERENCE TO RELATED APPLICATION

This application is a U.S. national stage application of International Application PCT/JP2018/008539 filed on Mar. 6, 2018, the contents of which are incorporated herein by reference.

TECHNICAL FIELD

The present disclosure relates to an air-conditioner.

BACKGROUND

Conventionally, an apparatus is known which stores heat in a thermal storage vessel prior to a defrosting operation and uses the heat stored in the thermal storage vessel during the defrosting operation so that the heating capability does not degrade during the defrosting operation.

For example, in the winter nighttime operation, the regenerative air-conditioner disclosed in Japanese Patent Laying-Open No. H8-28932 (PTL 1) performs a heat storage operation for turning water, which is a thermal storage medium, into warm water via a primary heat exchange unit within a thermal storage vessel by controlling a second expansion valve in a primary refrigeration cycle in which a compressor, a first four-way valve, an outdoor heat exchanger, the second expansion valve, and the primary heat exchange unit within the thermal storage vessel, which are included in the regenerative air-conditioner, are in communication.

In the heating operation when the outdoor air temperature is low, the apparatus disclosed in PTL 1 forms the primary refrigeration cycle, using the primary heat exchange unit within the thermal storage vessel as an evaporator and the outdoor heat exchanger as a condenser, and the secondary refrigeration cycle by opening the bypass valve, fully closing a flow regulating valve for the thermal storage vessel, and connecting the secondary heat exchanger within the thermal storage vessel and the secondary heat exchanger included in a refrigerant-to-refrigerant heat exchanger in series, to continue the heating operation.

PATENT LITERATURE

PTL 1: Japanese Patent Laying-Open No. H8-28932

The air-conditioner disclosed in PTL 1 requires a thermal storage vessel. However, in the environment where a thermal storage vessel cannot be installed, heat cannot be stored prior to the defrosting operation.

SUMMARY

Therefore, an object of the present disclosure is to provide an air-conditioner which can prevent the heating capability from degrading during the defrosting operation, without having to provide a thermal storage vessel.

An air-conditioner according to the present disclosure includes: a refrigerant circuit through which a refrigerant flows, the refrigerant circuit being formed of a compressor, a switching valve, a first heat exchanger, an expansion valve, and a second heat exchanger connected to one another by a first pipe; a heat-transfer medium circuit through which a heat-transfer medium flows, the heat-transfer medium circuit being formed of a pump, the first heat exchanger, and a third heat exchanger connected to one another by a second pipe; and control device that controls the compressor and the pump. In an operation of the air-conditioner performed before entering a defrosting operation, the control device increases a frequency of the compressor, as compared to the frequency of the compressor in a heating operation, and reduces a rotational speed of the pump, as compared to the rotational speed of the pump in the heating operation.

According to the present disclosure, prior to the defrosting operation, the frequency of the compressor is increased and the rotational speed of the pump is decreased, as compared to the frequency of the compressor and the rotational speed of the pump in the heating operation. This can prevent the heating capability from degrading during the defrosting operation, without having to provide a thermal storage vessel.

DETAILED DESCRIPTION

Hereinafter, embodiments according to the present disclosure will be described, with reference to the accompanying drawings.

Embodiment 1

Figure 1:
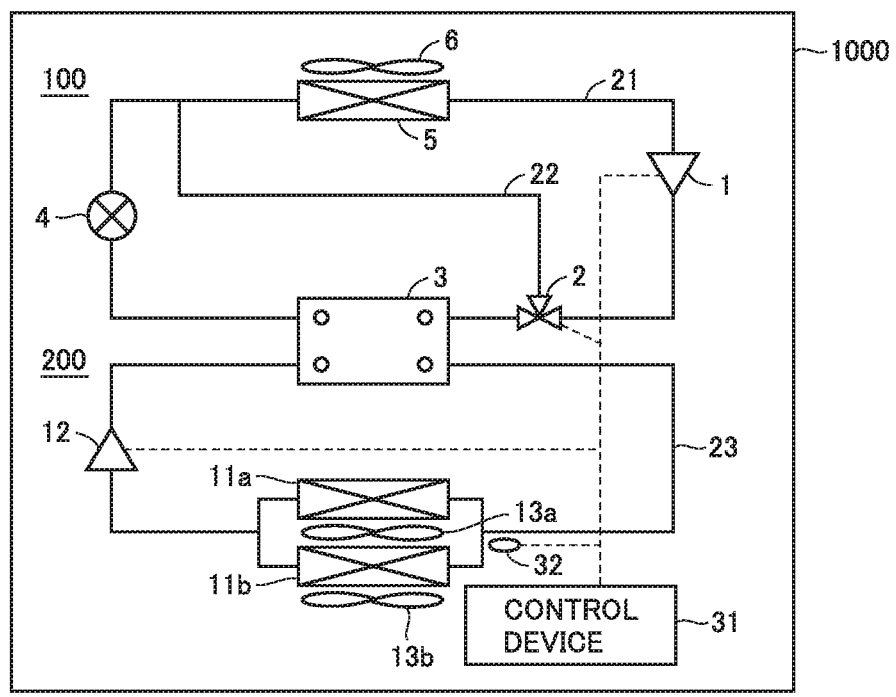
FIG. 1 is a diagram representing a configuration an air-conditioner 1000 according to Embodiment 1.

FIG. 1 is a diagram representing a configuration of an air-conditioner 1000 according to Embodiment 1.

Air-conditioner 1000 includes an outdoor unit and an indoor unit.

The outdoor unit includes: a refrigerant circuit 100; and a fan 6 for blowing to an outdoor heat exchanger 5. In refrigerant circuit 100, a compressor 1, a switching valve 2, a cascade heat exchanger 3, an expansion valve 4, and an outdoor heat exchanger 5 are connected to one another by a first connecting pipe 21 and a second connecting pipe 22 connected in parallel with compressor 1 and outdoor heat exchanger 5 is bypassed.

The indoor unit includes: a heat-transfer medium circuit 200; blowers 13a and 13b for blowing to indoor heat exchangers 11a and 11b, respectively; a control device 31; and a first temperature sensor 32. In heat-transfer medium circuit 200, indoor heat exchangers 11a and 11b connected in parallel, a pump 12, and cascade heat exchanger 3 are connected to one another by a third connecting pipe 23. In the following, indoor heat exchangers 11a and 11b may be collectively referred to as an indoor heat exchanger 11, and blowers 13a and 13b may be collectively referred to as a blower 13. Note that control device 31 may be provided outside the indoor unit.

Primary refrigerant circuit 100 has compressor 1, switching valve 2, cascade heat exchanger 3, expansion valve 4, and outdoor heat exchanger 5, which are connected to one another by first connecting pipe 21. Refrigerant circuit 100 further has second connecting pipe 22, which is a bypass pipe. Second connecting pipe 22 connects switching valve 2 and a branch between expansion valve 4 and outdoor heat exchanger 5 on first connecting pipe 21. A refrigerant flows through refrigerant circuit 100.

Air-conditioner 1000 switches the operation between a heating operation, a defrosting operation, and a preheating operation which is performed after the heating operation and prior to the defrosting operation. The preheating operation is performed prior to a defrosting operation to store heat to be used in the defrosting operation.

Secondary heat-transfer medium circuit 200 has pump 12, cascade heat exchanger 3, and indoor heat exchanger 11, which are connected to one another by third connecting pipe 23. A heat-transfer medium flows through heat-transfer medium circuit 200. The heat-transfer medium is, for example, antifreeze, water, or an antifreeze-water mixture.

In the description below, cascade heat exchanger 3, outdoor heat exchanger 5, and indoor heat exchanger 11 may be referred to as a first heat exchanger, a second heat exchanger, and a third heat exchanger, respectively.

Compressor 1 draws in and compresses a low-pressure refrigerant, and discharges it as a high-pressure refrigerant. Compressor 1 is, for example, an inverter compressor.

Switching valve 2 switches the flow passage of the refrigerant. In the heating operation and the preheating operation, switching valve 2 connects the discharge side of compressor 1 to the inlet of cascade heat exchanger 3, thereby forming a first flow passage which allows the refrigerant, discharged from compressor 1, to flow to cascade heat exchanger 3. In the defrosting operation, switching valve 2 connects the discharge side of compressor 1 to the inlet of outdoor heat exchanger 5 via second connecting pipe 22, which is a bypass pipe, thereby forming a second flow passage which allows the refrigerant, discharged from compressor 1, to flow to outdoor heat exchanger 5. Switching valve 2 switches the flow passage, according to an instruction signal from control device 31.

Cascade heat exchanger 3 causes heat exchange between the refrigerant compressed by compressor 1 and the heat-transfer medium discharged from pump 12. Cascade heat exchanger 3 is, for example, a plate heat exchanger.

Expansion valve 4 decompresses and expands the refrigerant discharged from cascade heat exchanger 3.

In the heating operation and the preheating operation, outdoor heat exchanger 5 causes the refrigerant decompressed by expansion valve 4 to exchange heat with the outdoor air in the defrosting operation, and causes the refrigerant discharged and directly sent from compressor 1 to exchange heat with the outdoor air. The air from blower 6 promotes the heat exchange in outdoor heat exchanger 5. Blower 6 includes a fan and a motor for rotating the fan.

Pump 12 supplies cascade heat exchanger 3 with the heat-transfer medium discharged from indoor heat exchanger 11.

Indoor heat exchanger 11 causes the heat-transfer medium to exchange heat with the indoor air. The air from blower 13 promotes the heat exchange in indoor heat exchanger 11. Blower 13 includes a fan and a motor for rotating the fan.

Figure 2:
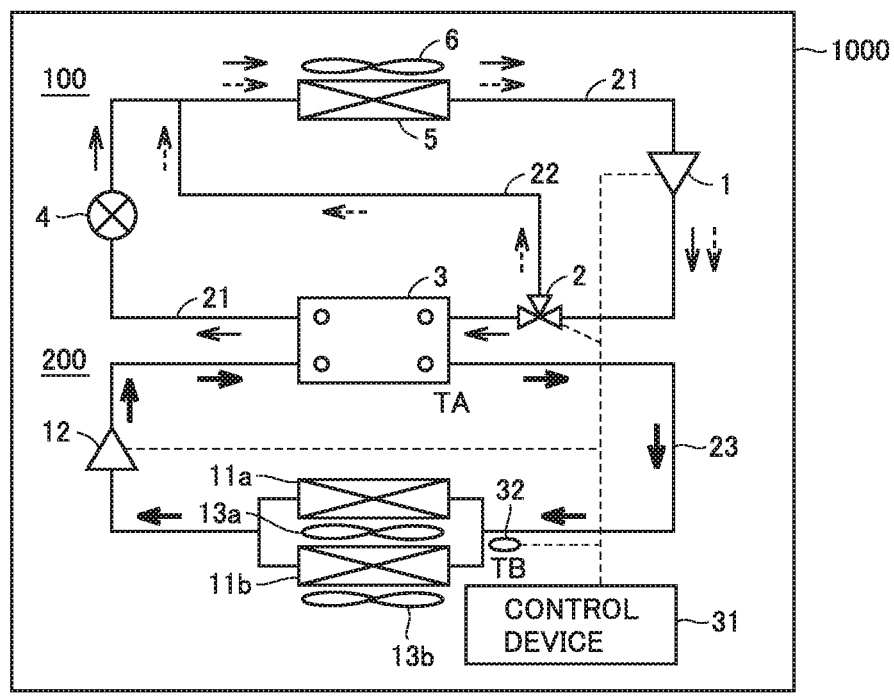
FIG. 2 is a diagram representing flows of a refrigerant and a heat-transfer medium in air-conditioner 1000.

FIG. 2 is a diagram representing flows of the refrigerant and the heat-transfer medium in air-conditioner 1000.

In the refrigerant circuit, the refrigerant flows through different flow passages in the heating operation, the preheating operation, and the defrosting operation.

In the heating operation and the preheating operation, the refrigerant compressed in compressor 1 passes through switching valve 2, cascade heat exchanger 3, expansion valve 4, and outdoor heat exchanger 5, and returns to compressor 1. In the defrosting operation, the refrigerant compressed in compressor 1 passes through switching valve 2, second connecting pipe 22, and outdoor heat exchanger 5, and returns to compressor 1.

In the heat-transfer medium circuit, the heat-transfer medium discharged from pump 12 is sent to cascade heat exchanger 3, passes through indoor heat exchanger 11, and returns to pump 12.

First temperature sensor 32 is disposed near the inlet of indoor heat exchanger 11. First temperature sensor 32 detects a temperature TB of the heat-transfer medium at the inlet of indoor heat exchanger 11.

Control device 31 obtains temperature TB output from first temperature sensor 32. Control device 31 controls compressor 1 and pump 12.

As compared to the frequency of compressor 1 and the rotational speed of pump 12 in the heating operation, control device 31 increases the frequency of compressor 1 to increase the temperature of the heat-transfer medium and reduces the rotational speed of pump 12 in the preheating operation, to prevent an excessive heating capability. In the preheating operation, control device 31 may increase the frequency of compressor 1, as compared to the frequency of compressor 1 in the heating operation, and then reduce the rotational speed of pump 12 in response to an increase of temperature TB of the heat-transfer medium at the inlet of indoor heat exchanger 11.

If temperature TB of the heat-transfer medium at the inlet of indoor heat exchanger 11 reaches a target temperature (threshold temperature) in the preheating operation, control device 31 switches the operation of refrigerant circuit 100 to the defrosting operation.

If the temperature of the heat-transfer medium at the inlet of indoor heat exchanger 11 decreases in the defrosting operation, control device 31 switches the operation of refrigerant circuit 100 to the heating operation.

Figure 3:
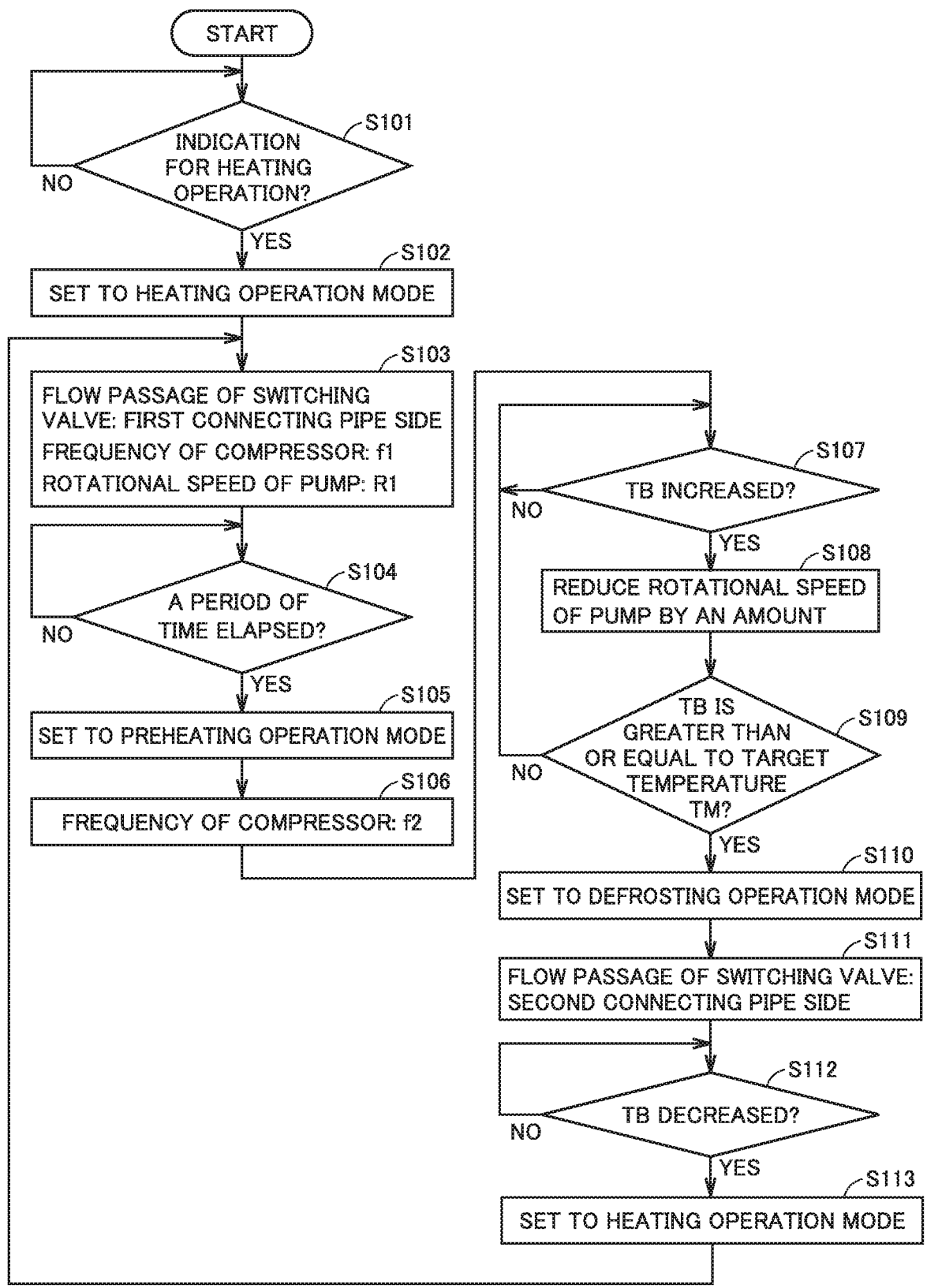
FIG. 3 is a flowchart representing an operational procedure of air-conditioner 1000 according to Embodiment 1.

FIG. 3 is a flowchart representing an operational procedure of air-conditioner 1000 according to Embodiment 1.

If an indication for the heating operation is input in step S101, the process proceeds to step S102.

In step S102, control device 31 sets air-conditioner 1000 to the heating operation mode.

In step S103, control device 31 sets the flow passage of switching valve 2 to the first connecting pipe 21 side. Control device 31 sets the frequency of compressor 1 to f1. Control device 31 sets the rotational speed of pump 12 to R1. Values of frequency f1 and rotational speed R1 are designed to yield optimal operating efficiency of the heating operation.

If a period of time has elapsed since the initiation of the heating operation in step S104, the process proceeds to step S105.

In step S105, control device 31 sets air-conditioner 1000 to the preheating operation mode.

In step S106, control device 31 increases the frequency of compressor 1 to f2, provided that f1<f2.

If temperature TB of the heat-transfer medium at the inlet of indoor heat exchanger 11, detected by first temperature sensor 32, increases in step S107, the process proceeds to step S108.

In step S108, control device 31 reduces the rotational speed of pump 12 by an amount.

If temperature TB of the heat-transfer medium at the inlet of indoor heat exchanger 11, detected by first temperature sensor 32, is greater than or equal to a predetermined target temperature TM in step S109, the process proceeds to step S110. If temperature TB of the heat-transfer medium at the inlet of indoor heat exchanger 11 is less than predetermined target temperature TM, the process returns to step S107. Primary refrigerant circuit 100 consumes an amount of heat to defrost the heat exchanger in the defrosting operation. Thus, target temperature TM may be a temperature corresponding to the amount of heat or more than not supplied to secondary heat-transfer medium circuit 200.

In step S110, control device 31 sets air-conditioner 1000 to the defrosting operation mode.

In step S111, control device 31 sets the flow passage of switching valve 2 to the second connecting pipe 22 side. Control device 31 maintains the frequency of compressor 1 and the rotational speed of pump 12 intact.

If temperature TB of the heat-transfer medium at the inlet of indoor heat exchanger 11, detected by first temperature sensor 32, decreases in step S112, the process proceeds to step S113.

In step S113, control device 31 switches air-conditioner 1000 to the heating operation mode, after which the process returns to step S103.

Figure 4:
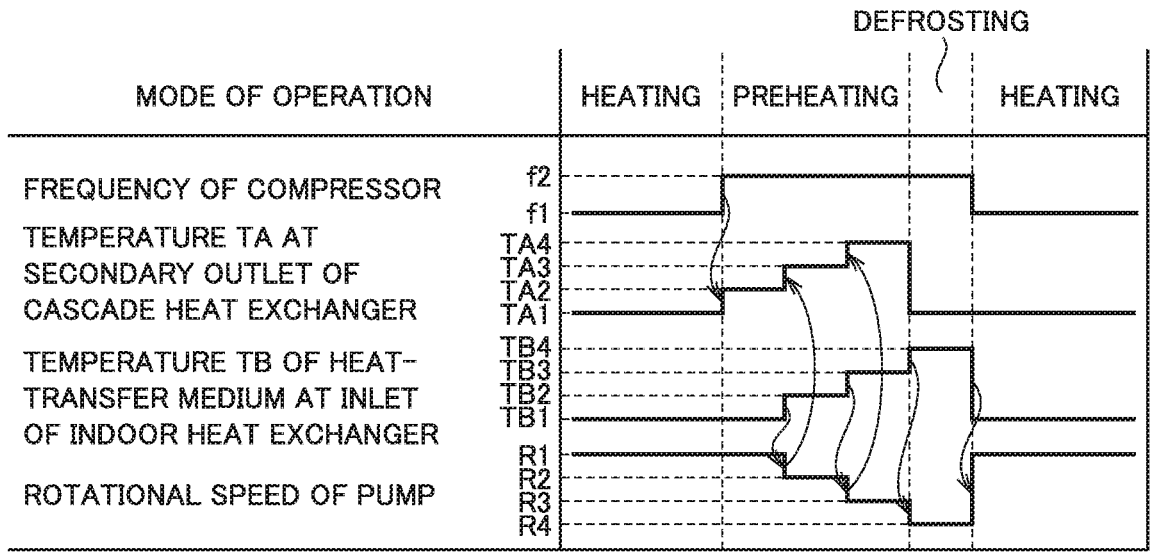
FIG. 4 is a timing chart of control of a compressor 1 and a pump 12 according to Embodiment 1.

FIG. 4 is a timing chart of control of compressor 1 and pump 12 according to Embodiment 1.

Suppose that the frequency of compressor 1 is f1 and the rotational speed of pump 12 is R1 in the heating operation. Suppose that temperature TA of the heat-transfer medium at the secondary outlet of cascade heat exchanger 3 is TA1 and temperature TB of the heat-transfer medium at the inlet of indoor heat exchanger 11 is TB1 in the heating operation.

As the preheating operation initiates, the frequency of compressor 1 increases to f2. This increases temperature TA of the heat-transfer medium at the secondary outlet of cascade heat exchanger 3 to TA2. After an elapse of a certain amount of time, the increase of temperature TA is transmitted to the inlet of indoor heat exchanger 11, and temperature TB increases to TB2.

As temperature TB increases, control device 31 reduces the rotational speed to pump 12 to R2. The reduction of rotational speed of pump 12 to R2 increases temperature TA of the heat-transfer medium at the secondary outlet of cascade heat exchanger 3 to TA3. After the elapse of a certain amount of time, the increase of temperature TA is transmitted to the inlet of indoor heat exchanger 11, and temperature TB increases to TB3.

As temperature TB increases, control device 31 reduces the rotational speed of pump 12 to R3. The decrease of rotational speed of pump 12 to R3 increases temperature TA of the heat-transfer medium at the secondary outlet of cascade heat exchanger 3 to TA4. After the elapse of a certain amount of time, the increase of temperature TA is transmitted to the inlet of indoor heat exchanger 11, and temperature TB increases to TB4.

As temperature TB increases, control device 31 reduces the rotational speed of pump 12 to R4. Moreover, temperature TB4 matches target temperature TM, and thus the operation of refrigerant circuit 100 transitions to the defrosting operation.

In the defrosting operation, a high-temperature refrigerant does not flow on the primary side of cascade heat exchanger 3, and thus the temperature TA of the heat-transfer medium at the secondary outlet of cascade heat exchanger 3 decreases to TA1. After the elapse of a certain amount of time, the reduction of temperature TA is transmitted to the inlet of indoor heat exchanger 11, and temperature TB decreases to TB1.

As temperature TB decreases, the operation of refrigerant circuit 100 transitions to the heating operation. Control device 31 increases the rotational speed of pump 12 to R1. Control device 31 reduces the frequency of compressor 1 to f1.

According to the present embodiment, the temperature of the heat-transfer medium flow through the secondary heat-transfer medium circuit is increased prior to the defrosting operation, thereby preventing the indoor heating capability from degrading even if the amount of heat is no longer supplied from the primary refrigerant circuit during the defrosting operation. The rotational speed of the pump is also reduced while the temperature of the heat-transfer medium flow through the secondary heat-transfer medium circuit is being increased, thereby suppressing the indoor comfort from being degraded by an excessive operation of the heating capability.

Embodiment 2

Embodiment 2 relates to a preferable control of the rotational speed of a pump in a preheating operation mode and a defrosting operation mode.

An amount of heat exchanged by indoor heat exchanger 11 is expressed by the following equation:

$$Q1 = Gw * Cp * (TB - TC) \quad (1)$$

where Q1 denotes the heating capability of indoor heat exchanger 11, Gw denotes a heat-transfer medium flow rate of pump 12, Cp denotes the specific heat at constant pressure of the heat-transfer medium, TB denotes the temperature of the heat-transfer medium at the inlet of indoor heat exchanger 11, and TC denotes the temperature of the heat-transfer medium at the outlet of indoor heat exchanger 11.

As temperature TB of the heat-transfer medium at the inlet of indoor heat exchanger 11 increases, a control device 31 reduces heat-transfer medium flow rate Gw of pump 12 so that the heating capability Q1 is the same as before the increase of temperature TB.

If an increase of temperature TB of the heat-transfer medium at the inlet of indoor heat exchanger 11 is detected, the control device 31 reduces the flow rate of the pump to Gwc indicated by Equation (2) below, where TBo denotes the previous temperature of the heat-transfer medium at the inlet of indoor heat exchanger 11, TBc denotes the current temperature of the heat-transfer medium at the inlet of indoor heat exchanger 11, Gwo denotes the current flow rate of pump 12, TCo denotes the previous temperature of the heat-transfer medium at the outlet of indoor heat exchanger 11, and TCc denotes the current temperature of the heat-transfer medium at the outlet of indoor heat exchanger 11.

$$Gwc=Gwo*\{(TBo-TCo)/(TBc-TCc)\} \qquad (2)$$

The amount of heat exchanged by cascade heat exchanger 3 is expressed by the following equation:

$$Q2=Gw*Cp*(TC-TA) \qquad (3)$$

where Q2 denotes the heating capability of cascade heat exchanger 3, and TA denotes the temperature of the heat-transfer medium at the secondary outlet of cascade heat exchanger 3.

As indicated by Equation (3), as heat-transfer medium flow rate Gw of pump 12 decreases in response to an increase of temperature TB, temperature TA increases.

Figure 5:
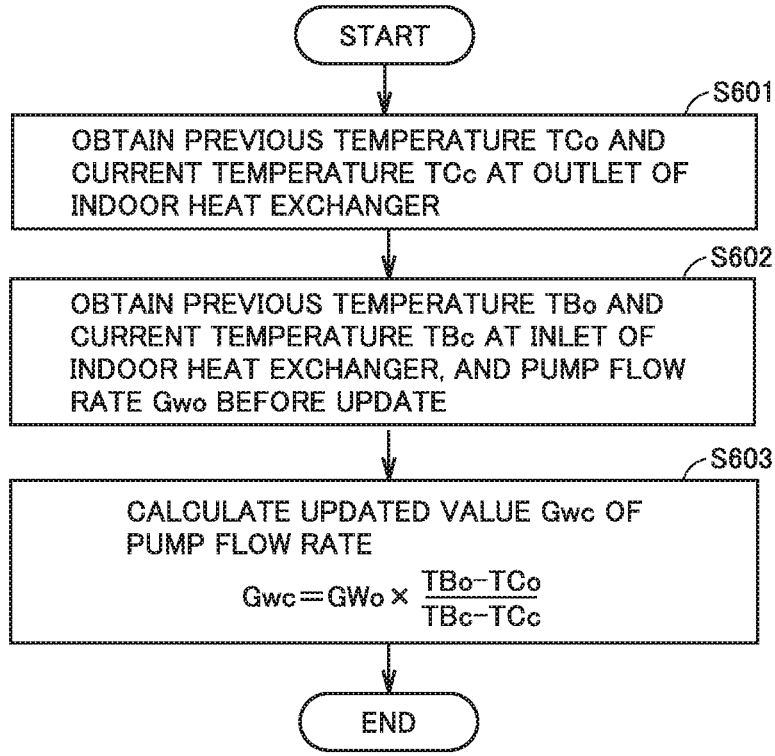
FIG. 5 is a flowchart representing a procedure for reducing a rotational speed of a pump 12 according to Embodiment 2.

FIG. 5 is a flowchart representing a procedure for reducing the rotational speed of pump 12 according to Embodiment 2. In Embodiment 2, the following processing is performed, instead of step S108 of FIG. 3 with respect to Embodiment 1.

In step S601, control device 31 obtains the previous temperature TCo and the current temperature TCc of the heat-transfer medium at the outlet of indoor heat exchanger 11. The temperatures TCo and TCc are detected by temperature sensors not shown.

In step S602, control device 31 obtains the previous temperature TBo and the current temperature TBc of the heat-transfer medium at the inlet of indoor heat exchanger 11 and heat-transfer medium flow rate Gwo corresponding to rotational speed Ro of pump 12 before the update.

In step S603, control device 31 calculates an updated heat-transfer medium flow rate Gwc of pump 12, according to Equation (2).

According to the present embodiment, in the preheating operation and the defrosting operation, if the temperature of the heat-transfer medium at the inlet of the indoor heat exchanger increases, the heat-transfer medium flow rate of the pump is reduced, thereby preventing the heating capability prevented from changing. As a result, the indoor temperature can be kept constant in the preheating operation and the defrosting operation.

Embodiment 3

Embodiment 3 relates to setting a preferable target temperature TM.

Figure 6:
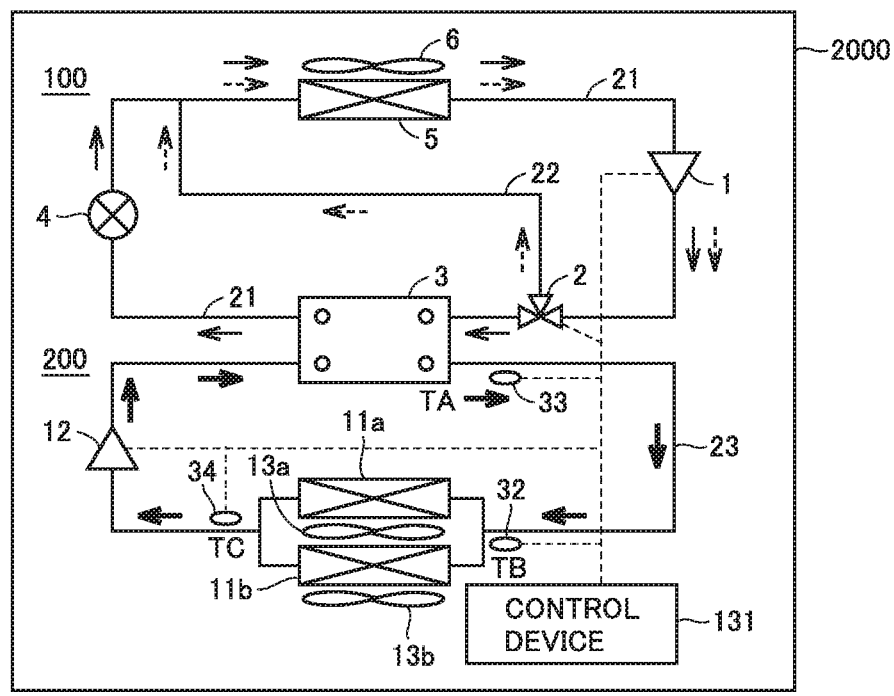
FIG. 6 is a diagram representing a configuration of an air-conditioner 2000 according to Embodiment 3.

FIG. 6 is a diagram representing a configuration of an air-conditioner 2000 according to Embodiment 3.

Air-conditioner 2000 according to Embodiment 3 is the same as air-conditioner 1000 according to Embodiment 1, except that air-conditioner 2000 includes a second temperature sensor 33 and a third temperature sensor 34, and includes a control device 131, instead of control device 31.

Second temperature sensor 33 is disposed near the outlet of a cascade heat exchanger 3. Second temperature sensor 33 detects a temperature TA of a heat-transfer medium at the secondary outlet of cascade heat exchanger 3.

Third temperature sensor 34 is disposed near the outlet of an indoor heat exchanger 11. Third temperature sensor 34 detects a temperature TC of the heat-transfer medium at the outlet of indoor heat exchanger 11.

Control device 131 sets target temperature TM, based on an amount of heat-transfer medium present between the secondary outlet of cascade heat exchanger 3 and the inlet of indoor heat exchanger 11, and an amount of heat stored in the heat-transfer medium in the preheating operation. The amount of heat stored in the heat-transfer medium in the preheating operation can be greater than or equal to an amount of heat that is required to melt an expected maximum amount of frost formed on outdoor heat exchanger 5.

Figure 7:
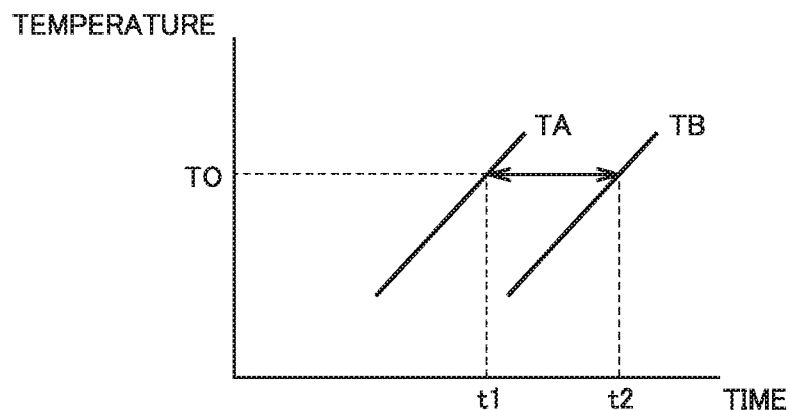
FIG. 7 is a diagram schematically representing changes in temperature TA of a heat-transfer medium at a secondary outlet of a cascade heat exchanger 3 and changes in temperature TB of the heat-transfer medium at an inlet of an indoor heat exchanger 11 over time, in a preheating operation.

FIG. 7 is a diagram schematically representing changes in temperature TA of the heat-transfer medium at the secondary outlet of cascade heat exchanger 3 over time and changes in temperature TB of the heat-transfer medium at the inlet of indoor heat exchanger 11 over time, in the preheating operation.

In the preheating operation, temperature TA and temperature TB increase over time.

Suppose that the temperature TA has reached a temperature TO at time t1, and the temperature TB has reached temperature TO at time t2. A difference $\Delta t$ between t2 and t1 reflects an amount MW of heat-transfer medium present between the secondary outlet of cascade heat exchanger 3 and indoor heat exchanger 11. In other words, amount MW of heat-transfer medium present between the secondary outlet of cascade heat exchanger 3 and indoor heat exchanger 11 can be determined by multiplying $\Delta t$ by the heat-transfer medium flow rate of pump 12. Amount MW of heat-transfer medium present between the secondary outlet of cascade heat exchanger 3 and indoor heat exchanger 11 is determined because the temperature of the heat-transfer medium between the outlet of indoor heat exchanger 11 and the primary inlet of cascade heat exchanger 3 is kept constant, while the temperature of the heat-transfer medium between the secondary outlet of cascade heat exchanger 3 and indoor heat exchanger 11 changes.

During test operation of air-conditioner 1000, control device 131 increases the frequency of compressor 1 greater than in the heating operation, and keeps the flow rate of pump 12 constant. Control device 131 multiplies the flow rate of pump 12 by a difference between the time at which the temperature TA of the heat-transfer medium at the secondary outlet of cascade heat exchanger 3 has reached a predetermined temperature and the time at which the temperature of the heat-transfer medium at the inlet of indoor heat exchanger 11 has reached a predetermined temperature, thereby calculating an amount of heat-transfer medium present between the secondary outlet of cascade heat exchanger 3 and the inlet of indoor heat exchanger 11.

Figure 8:
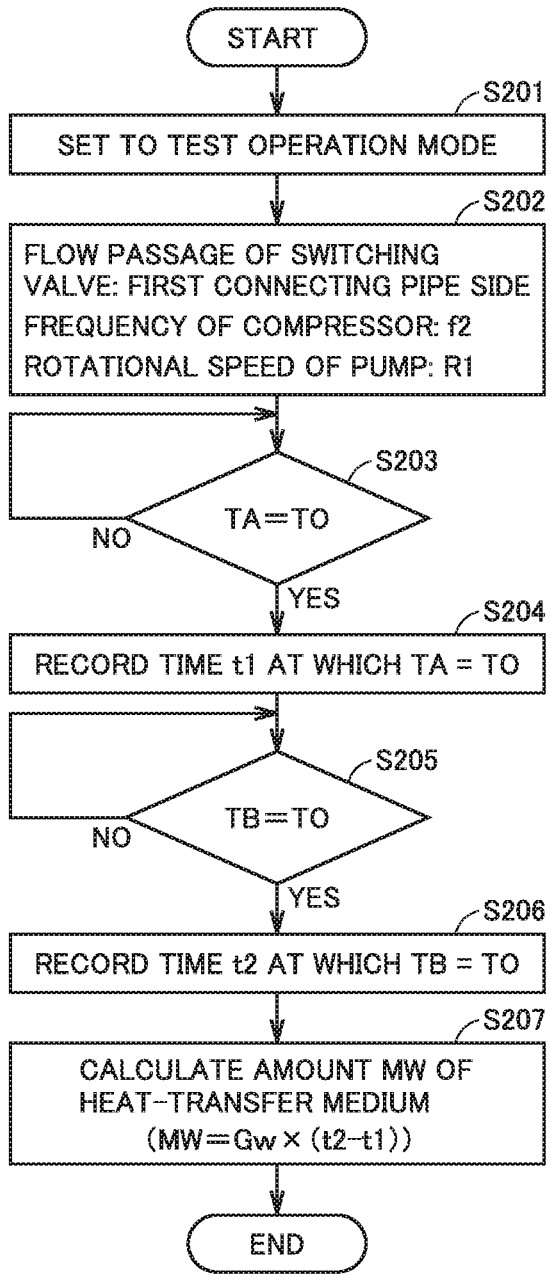
FIG. 8 is a flowchart representing a procedure for identifying an amount MW of heat-transfer medium present between an outlet of cascade heat exchanger 3 and indoor heat exchanger 11.

FIG. 8 is a flowchart representing a procedure for identifying an amount MW of heat-transfer medium present between the outlet of cascade heat exchanger 3 and indoor heat exchanger 11.

In step S201, control device 131 sets air-conditioner 1000 to a test operation mode.

In step S202, control device 131 sets the flow passage of switching valve 2 to the first connecting pipe 21 side. Control device 131 sets the frequency of compressor 1 to f2. Control device 131 sets the rotational speed of pump 12 to R1.

If temperature TA of the heat-transfer medium at the secondary outlet of cascade heat exchanger 3, detected by second temperature sensor 33, has reached predetermined temperature TO in step S203, the process proceeds to step S204.

In step S204, control device 131 records time t1 at which the temperature TA has reached temperature TO.

If temperature TB of the heat-transfer medium at the inlet of indoor heat exchanger 11, detected by first temperature sensor 32, has reached a predetermined temperature TO in step S205, the process proceeds to step S206.

In step S206, control device 131 records time t2 at which the temperature TB has reached temperature TO.

In step S207, control device 131 calculates an amount MW of heat-transfer medium, according to Equation (4), provided that Gw is a heat-transfer medium flow rate corresponding to rotational speed R1 of pump 12.

$$MW=Gw*(t2-t1) \quad (4)$$

Control device 131 calculates target temperature TM using the following equation, where MW denotes an amount of heat-transfer medium present between the secondary outlet of cascade heat exchanger 3 and the inlet of indoor heat exchanger 11, Qy denotes an amount of heat stored in the heat-transfer medium in the preheating operation, TB denotes a temperature of the heat-transfer medium at the inlet of indoor heat exchanger 11 at the initiation of the preheating operation, and Cp denotes a specific heat at constant pressure of the heat-transfer medium.

$$TM=\{Qy/(MW*Cp)\}+TB \quad (5)$$

Figure 9:
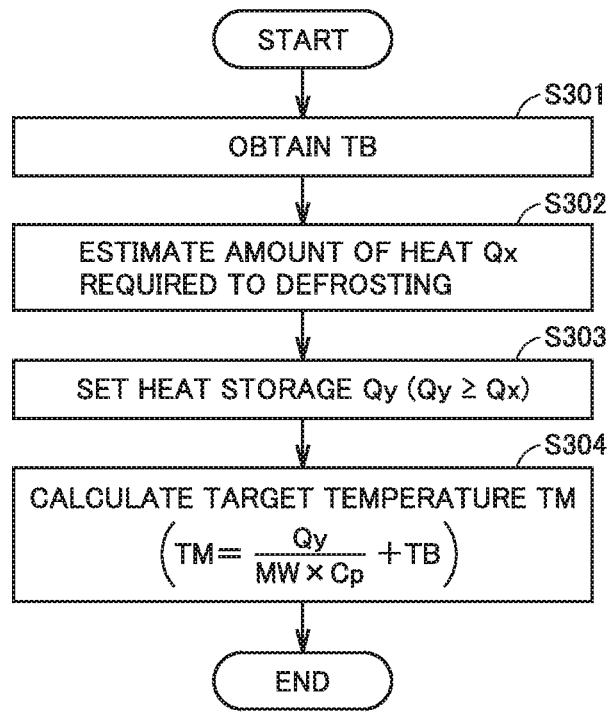
FIG. 9 is a diagram representing a target temperature TM determination procedure.

FIG. 9 is a diagram representing a target temperature TM determination procedure.

In step S301, control device 131 obtains temperature TB of the heat-transfer medium at the inlet of indoor heat exchanger 11, detected by first temperature sensor 32, at the initiation of the preheating operation.

In step S302, control device 131 determines an amount of heat Qx that is required to melt an expected maximum amount of frost formed on outdoor heat exchanger 5. The expected maximum amount of frost formed on outdoor heat exchanger 5 and the amount of heat Qx can be approximated at the design time.

In step S303, control device 131 sets an amount of heat that is greater than the amount of heat Qx required to defrost the outdoor heat exchanger 5, as the amount of heat Qy that is stored in the heat-transfer medium in the preheating operation.

In step S304, control device 131 calculates target temperature TM, according to Equation (5), based on the heat storage Qy, amount MW of heat-transfer medium, temperature TB of the heat-transfer medium at the inlet of indoor heat exchanger 11 at the initiation of the preheating operation, and the specific heat at constant pressure Cp of the heat-transfer medium.

In Embodiment 3, target temperature TM so calculated is used in step S109 of FIG. 3.

According to the present embodiment, temperature TB is increased to target temperature TM in the preheating operation, thereby storing an amount of heat greater than the amount of heat required to defrost the outdoor heat exchanger 5 can be stored in the heat-transfer medium.

Embodiment 4

Embodiment 4 relates to a method of control of a pump, without a delay, in response to changes in temperature of a heat-transfer medium.

Figure 10:
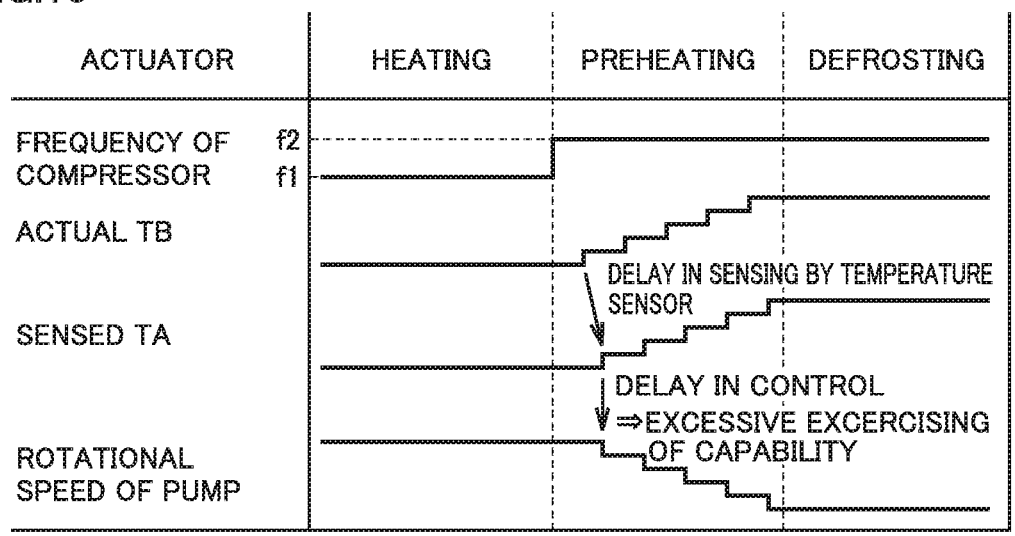
FIG. 10 is a timing chart of changes in temperature TB and control of pump 12 according to Embodiment 1.

FIG. 10 is a timing chart of changes in temperature TB and control of a pump 12 according to Embodiment 1.

As shown in FIG. 10, a change in temperature TB is detected at a time later in time than a time at which temperature TB of a heat-transfer medium at an inlet of an indoor heat exchanger 11 actually changes. The rotational speed of pump 12 is controlled in response to detection of a change in temperature TB. Thus, pump 12 is controlled at a time that is later in time than a time at which pump 12 should otherwise be controlled.

Figure 11:
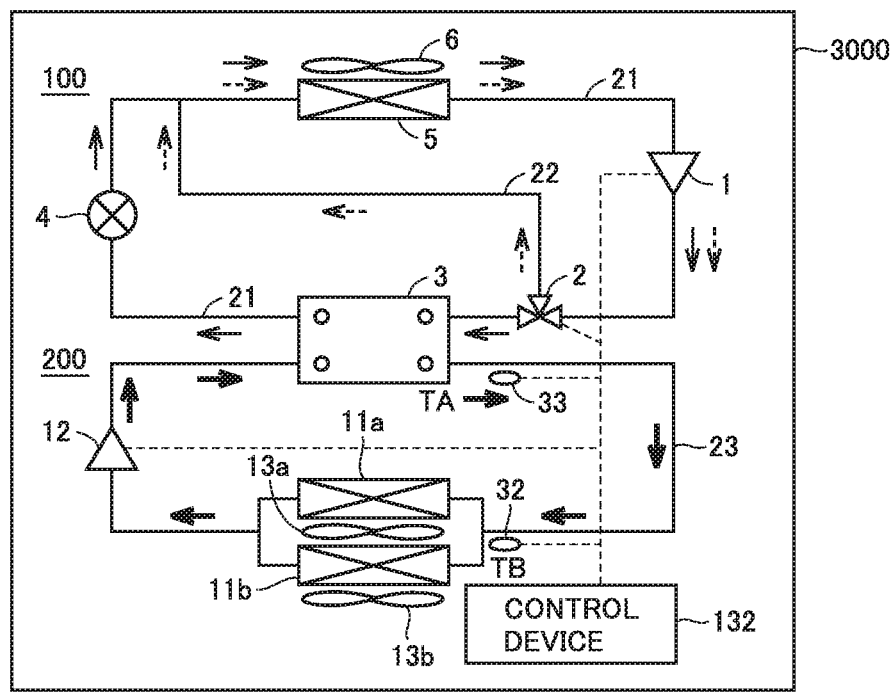
FIG. 11 is a diagram representing a configuration of an air-conditioner 3000 according to Embodiment 4.

FIG. 11 is a diagram representing a configuration of an air-conditioner 3000 according to Embodiment 4.

Air-conditioner 3000 according to Embodiment 4 is the same as air-conditioner 1000 according to Embodiment 1, except that air-conditioner 3000 includes a second temperature sensor 33, and includes a control device 132, instead of control device 31.

Control device 132 determines that temperature TB of the heat-transfer medium at the inlet of indoor heat exchanger 11 has increased after the elapse of (Δt−td) period since the time at which an increase of temperature TA of the heat-transfer medium at the secondary outlet of a cascade heat exchanger 3 has been detected, and controls the rotational speed of pump 12, provided that Δt is a value obtained by dividing the amount of heat-transfer medium present between the secondary outlet of cascade heat exchanger 3 and the inlet of indoor heat exchanger 11 by the current flow rate of the pump, td is a value unique to the second temperature sensor which detects the temperature of the heat-transfer medium at the secondary outlet of cascade heat exchanger 3.

Figure 12:
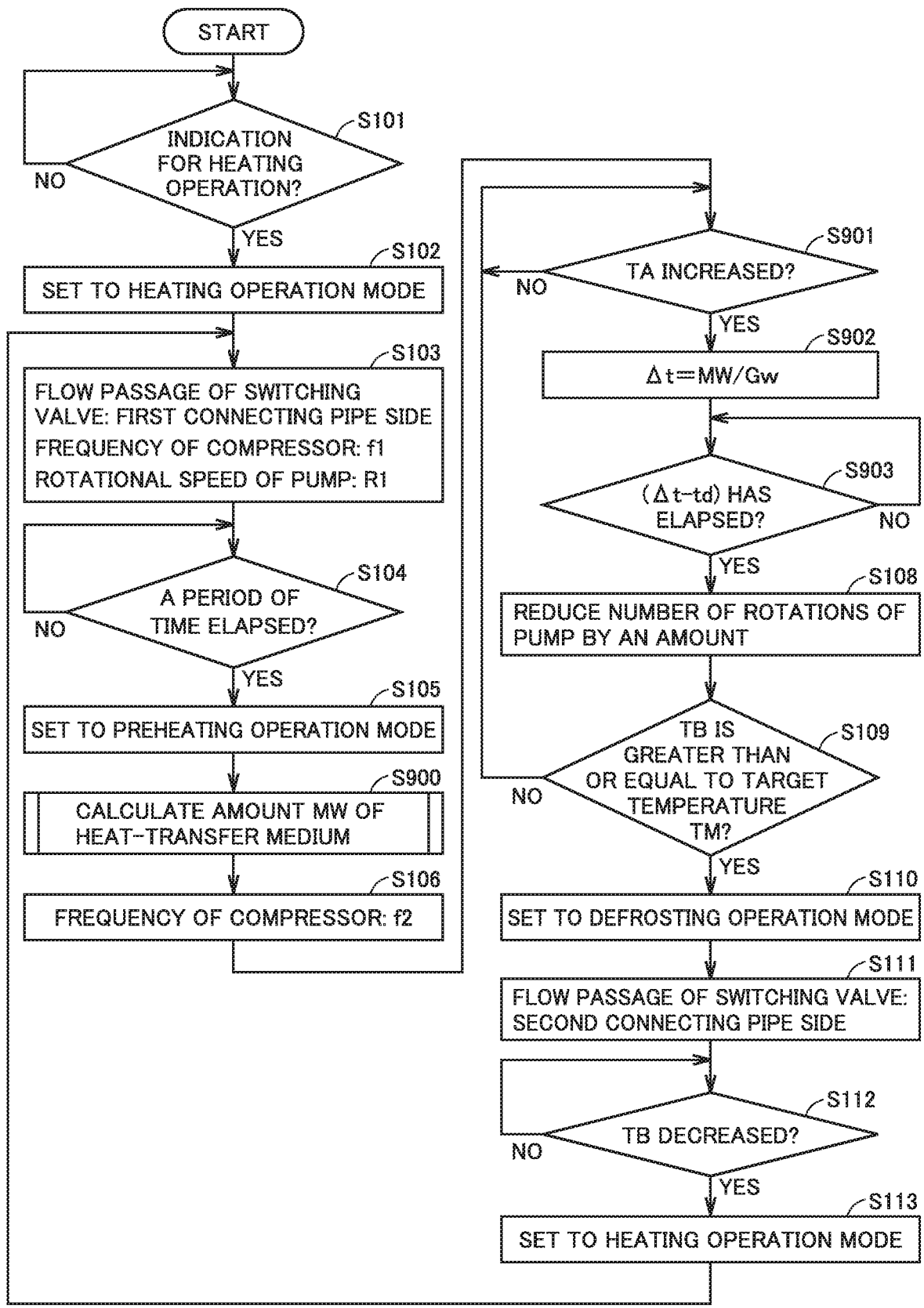
FIG. 12 is a flowchart representing an operational procedure of an air-conditioner 1000 according to Embodiment 4.

FIG. 12 is a flowchart representing an operational procedure of air-conditioner 1000 according to Embodiment 4.

The flowchart of FIG. 12 is the same as the flowchart of FIG. 3 with respect to Embodiment 1, except for including step S900 between step S105 and step S106, and including steps S901, S902, and S903, instead of steps S107 and S108.

In step S900, control device 132 identifies an amount MW of heat-transfer medium present between the secondary outlet of cascade heat exchanger 3 and the inlet of indoor heat exchanger 11. The specific procedure is the same as illustrated in the flowchart of FIG. 8.

If temperature TA of the heat-transfer medium at the secondary outlet of cascade heat exchanger 3, detected by second temperature sensor 33, increases in step S901, the process proceeds to step S902.

In step S902, using the amount MW of heat-transfer medium, control device 132 calculates time Δt taken for the heat-transfer medium at the secondary outlet of cascade heat exchanger 3 to reach the inlet of indoor heat exchanger 11, according to Equation (6). Here, Gw denotes the current heat-transfer medium flow rate of pump 12.

$$\Delta t=Mw/Gw \quad (6)$$

If (Δt—td) period has elapsed since the time at which an increase of temperature TA has been detected in step S903, the process proceeds to step S108. Here, td is a fixed value depending on second temperature sensor 33.

Figure 13:
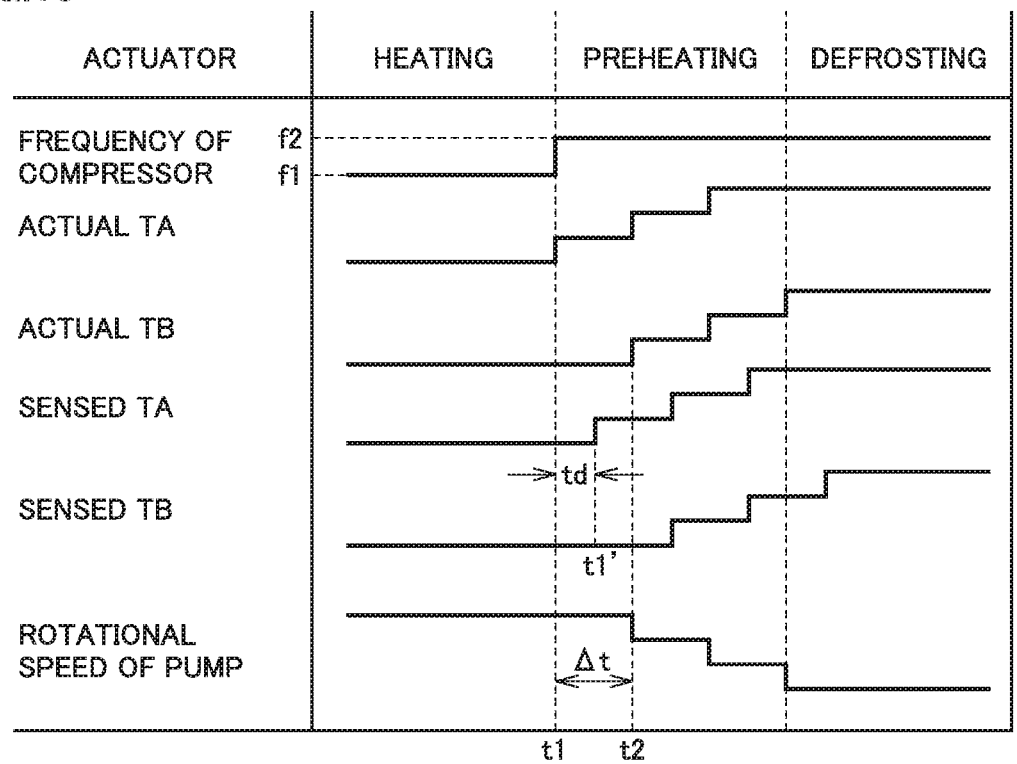
FIG. 13 is a timing chart of changes in temperatures TA and TB, and control of a pump 12 according to Embodiment 4.

FIG. 13 is a timing chart of changes of temperatures TA and TB and control of pump 12 according to Embodiment 4.

At time t1, temperature TA actually increases. Second temperature sensor 33 detects the increase of temperature TA at time t1'. Time t1' is later in time than time t1 by td. td represents the sensibility of second temperature sensor 33, and is a value unique to second temperature sensor 33.

Temperature TB increases at time t2, elapsed from time t1 by Δt. Accordingly, time t2 at which temperature TB increases is represented by the following equation:

$$t2=t1+\Delta t=(t1'-td)+\Delta t=t1+(\Delta t-td) \quad (7)$$

Thus, a delay in the control timing can be avoided by controlling the rotational speed of pump 12 after the elapse of (Δt−td) since the time at which an increase of temperature TA has been detected by second temperature sensor 33.

As described above, according to the present embodiment, an increase of temperature TA of the heat-transfer medium at the secondary outlet of the cascade heat exchanger is detected, thereby identifying a time at which temperature TB of the heat-transfer medium at the inlet of the indoor heat exchanger increases, at which time the pump is controlled. This can eliminate any delay in controlling the pump.

Variation

The present disclosure is not limited to the above embodiments, and includes a variation as below, for example.

(1) Control of Pump 12

While in the above embodiments, the rotational speed of pump 12 is reduced by detecting an increase of temperature TB of the heat-transfer medium at the inlet of indoor heat exchanger 11 by first temperature sensor 32, the present disclosure is not limited thereto. For example, the rotational speed of pump 12 may be reduced in response to a change in discharge temperature of indoor heat exchanger 11. Alternatively, the rotational speed of pump 12 may be reduced at regular intervals since the initiation of the preheating operation.

(2) Initiation of the Defrosting Operation

While in the above embodiments, the operation of the air-conditioner switches to the preheating operation after the elapse of a period of time since the initiation of the heating operation, the present disclosure is not limited thereto. For example, the operation of the air-conditioner may switch to the preheating operation when an amount of frost formed on the outdoor heat exchanger is greater than or equal to a predetermined amount.

(3) End of the Defrosting Operation

While in the above embodiments, the defrosting operation ends when a decrease of temperature TB of the heat-transfer medium at the inlet of indoor heat exchanger 11 is detected, the present disclosure is not limited thereto. For example, the defrosting operation may end when the outdoor heat exchanger is defrosted, when an amount of frost formed on the outdoor heat exchanger is less than or equal to a predetermined amount, or when a period of time has elapsed since the initiation of the defrosting operation.

(4) The Frequency of the Compressor During the Defrosting Operation

While in the above embodiments, the frequency of the compressor in the defrosting operation and the frequency of the compressor in the preheating operation are the same, the present disclosure is not limited thereto. The frequency of the compressor in the defrosting operation may be greater than or less than the frequency of the compressor in the preheating operation. Alternatively, the frequency of the compressor in the defrosting operation may be set in accordance with an amount of frost formed on the outdoor heat exchanger.

The presently disclosed embodiment should be considered in all aspects as illustrative and not restrictive. The scope of the present disclosure is indicated by the appended claims, rather than by the description above, and all changes that come within the scope of the claims and the meaning and range of equivalency of the claims are intended to be embraced within their scope.

The invention claimed is:

1. An air-conditioner, comprising:
a refrigerant circuit through which a refrigerant flows, the refrigerant circuit being formed of a compressor, a switching valve, a first heat exchanger, an expansion valve, and a second heat exchanger connected to one another by a first pipe;
a heat-transfer medium circuit through which a heat-transfer medium flows, the heat-transfer medium circuit being formed of a pump, the first heat exchanger, and a third heat exchanger connected to one another by a second pipe; and
a controller that controls the compressor and the pump, wherein
in an operation of the air-conditioner performed before entering a defrosting operation, the controller increases a frequency of the compressor, as compared to the frequency of the compressor in a heating operation, and reduces a rotational speed of the pump, as compared to the rotational speed of the pump in the heating operation, in the operation of the air-conditioner before entering the defrosting operation, the controller increases the frequency of the compressor, as compared to the frequency of the compressor in the heating operation, after which the controller reduces the rotational speed of the pump in response to an increase in temperature of the heat-transfer medium at an inlet of the third heat exchanger.

2. The air-conditioner according to claim 1, wherein
in the operation of the air-conditioner before entering the defrosting operation, when the temperature of the heat-transfer medium at the inlet of the third heat exchanger increases, the controller reduces a flow rate of the pump to Gwc in Equation A1:

$$Gwc = Gwo * \{(TBo - TCo)/(TBc - TCc)\} \quad (A1)$$

where TBo denotes a previous temperature of the heat-transfer medium at the inlet of the third heat exchanger, TBc denotes a current temperature of the heat-transfer medium at the inlet of the third heat exchanger, Gwo denotes a current flow rate of the pump, TCo denotes a previous temperature of the heat-transfer medium at an outlet of the third heat exchanger, and TCc denotes a current temperature of the heat-transfer medium at the outlet of the third heat exchanger.

3. The air-conditioner according to claim 1, wherein
in the operation of the air-conditioner before entering the defrosting operation, the controller switches the operation of the air-conditioner to the defrosting operation when a temperature of the heat-transfer medium at an inlet of the third heat exchanger reaches a threshold temperature.

4. The air-conditioner according to claim 3, wherein
the controller sets the threshold temperature based on an amount of the heat-transfer medium present between a secondary outlet of the first heat exchanger and the inlet of the third heat exchanger, and an amount of heat stored in the heat-transfer medium in the operation of the air-conditioner before entering the defrosting operation; the secondary outlet of the first heat exchanger being an outlet of a flow passage in the first heat exchanger through which the heat-transfer medium flows.

5. The air-conditioner according to claim 4, wherein during a test operation of the air-conditioner the controller:
increases the frequency of the compressor to be greater than in the heating operation and keeps a flow rate of the pump constant, and
calculates the amount of heat-transfer medium present between the secondary outlet of the first heat exchanger and the inlet of the third heat exchanger by multiplying the flow rate of the pump by a difference between a time at which the temperature of the heat-transfer medium at the secondary outlet of the first heat exchanger has reached a predetermined temperature and a time at which the temperature of the heat-transfer medium at the inlet of the third heat exchanger has reached the predetermined temperature.

6. The air-conditioner according to claim 5, wherein the amount of heat stored in the heat-transfer medium in the operation of the air-conditioner before entering the defrosting operation is greater than or equal to an amount of heat required to melt an expected maximum amount of frost formed on the second heat exchanger.

7. The air-conditioner according to claim 6, wherein the controller calculates the threshold temperature TM using Equation A2:

$$TM=\{Qy/(MW*Cp)\}+TB \quad (A2)$$

where MW denotes the amount of heat-transfer medium present between the secondary outlet of the first heat exchanger and the inlet of the third heat exchanger, Qy denotes the amount of heat stored in the heat-transfer medium in the operation of the air-conditioner before entering the defrosting operation, TB denotes the temperature of the heat-transfer medium at the inlet of the third heat exchanger in the operation of the air-conditioner before entering the defrosting operation, and Cp denotes a specific heat at constant pressure of the heat-transfer medium.

8. The air-conditioner according to claim 1, wherein when a temperature of the heat-transfer medium at an inlet of the third heat exchanger decreases in the defrosting operation the controller switches the operation of the air-conditioner to the heating operation.

9. The air-conditioner according to claim 1, wherein the controller determines that the temperature of the heat-transfer medium at the inlet of the third heat exchanger has increased after an elapse of a (Δt-td) period since a time at which an increase of the temperature of the heat-transfer medium at a secondary outlet of the first heat exchanger has been detected, the secondary outlet of the first heat exchanger being an outlet of a flow passage in the first heat exchanger through which the heat-transfer medium flows,
where Δt is a value obtained by dividing an amount of the heat-transfer medium present between the secondary outlet of the first heat exchanger and the inlet of the third heat exchanger by a current flow rate of the pump, and td is a value unique to a temperature sensor which detects the temperature of the heat-transfer medium at the secondary outlet of the first heat exchanger.

* * * * *